United States Patent [19]  [11] 3,977,766
Langworthy et al.  [45] Aug. 31, 1976

[54] PROJECTION SCREEN AND APPARATUS FOR THE FABRICATION THEREOF

[75] Inventors: Harold F. Langworthy; Robert N. Wolfe, both of Rochester, N.Y.

[73] Assignee: Eastman Kodak Company, Rochester, N.Y.

[22] Filed: Apr. 24, 1975

[21] Appl. No.: 571,124

[52] U.S. Cl. .................................. 350/127; 83/5; 83/71; 83/801; 350/129
[51] Int. Cl.² ...................... G03B 21/60; B21D 3/06
[58] Field of Search ........................... 350/127–129; 83/5, 71, 648, 801

[56] References Cited
UNITED STATES PATENTS

| | | | |
|---|---|---|---|
| 1,970,358 | 8/1934 | Bull et al. ........................... | 350/128 |
| 2,279,555 | 4/1942 | Browne et al. ...................... | 350/128 |
| 2,706,930 | 4/1955 | Jansen ................................. | 350/128 |
| 2,875,087 | 2/1959 | Crandon ............................. | 117/10 |
| 3,587,378 | 6/1971 | Oppenheim .......................... | 83/801 |
| 3,754,811 | 8/1973 | Hoadley et al. ...................... | 350/127 |
| 3,754,813 | 8/1973 | DePalma et al. .................... | 350/127 |
| 3,765,281 | 10/1973 | Wolfe et al. ......................... | 83/5 |
| 3,788,171 | 1/1974 | Hoadley et al. ...................... | 83/5 |
| 3,809,457 | 5/1974 | Kurtz et al. .......................... | 350/128 |

Primary Examiner—Richard A. Wintercorn
Attorney, Agent, or Firm—John D. Husser

[57] ABSTRACT

A projection screen of improved aesthetic quality. The screen comprises a plurality of rectilinear rows of precisely contoured optical microelements each adapted to redistribute substantially all of the incident image flux through a predefined audience angle with uniform luminance. The microelements are formed in a surface of a work piece by applying an electrical signal of predefined waveform but of random frequency to the input of the cutting stylus of a sound recording head which moves relative to the work piece in a series of parallel traverses. The electrical signal is recorded on a memory element which moves with the work piece past a stationary pickup head as each row is cut. Because the same signal from the memory element is used to cut each row, an identical phase relationship is maintained between the microelements in adjacent rows.

11 Claims, 12 Drawing Figures

DIRECTION OF
WORKPIECE TRAVEL

PROJECTION SCREEN AND APPARATUS FOR THE FABRICATION THEREOF

CROSS REFERENCE TO RELATED APPLICATIONS

Reference is made to the commonly assigned U.S. Pat. No. 3,754,811 issued Aug. 28, 1973 in the names of Hoadley, Wolfe, Langworthy and DePalma; U.S. Pat. No. 3,754,813 issued Aug. 28, 1973 in the names of DePalma an Langworthy; U.S. Pat. No. 3,765,281 issued Oct. 16, 1973 in the names of Wolfe, Palmer, Hoadley and VanHeyningen; U.S. Pat. No. 3,788,171 issued Jan. 29, 1974 in the names of Hoadley, Wolfe, Palmer and VanHeyningen; U.S. Pat. No. 3,809,457 issued May 7, 1974 in the names of Kurtz and DePalma; and U.S. Pat. application Ser. No. 425,416 filed Dec. 17, 1973 in the name of Robert N. Wolfe.

BACKGROUND OF THE INVENTION

1. Field of the Invention

The present invention relates to front and rear projection screens of the type comprising a plurality of rectilinear rows of optical microelements, each of which is specially contoured to distribute image flux so as to produce substantially constant luminance throughout a predefined solid audience angle. More particularly, the present invention relates to improvements in the aesthetic appearance of such screens. Additionally, the present invention relates to apparatus for fabricating the screens.

2. Description of the Prior Art

In the above-referenced U.S. Pat. No. 3,754,813 radiation redistributive devices such as front and rear projection screens are disclosed having a light distributing surface which comprises a plurality of rectilinear grooves. The depth of each of the grooves undulates in a periodic manner along the groove length in accordance with a predetermined waveform to define a row of substantially uniformly sized optical microelements which produce substantially uniform radiance throughout a predefined region of utility. U.S. Pat. No. 3,765,281 discloses an apparatus and a method for fabricating such a projection screen. Briefly, the screen is fabricated by employing the cutting stylus of a sound recording head as a tool for cutting the light distributing surface of the screen and by modulating the cutting position of the stylus with an electrical signal of a predefined waveform. Ideally, the undulation representing the depth profile of each groove should be perfectly in phase with that of all other grooves, since slight changes in phase relationship between optical microelements give rise to a surface having a streaky appearance. However, since the grooves are necessarily cut in a sequential manner, the work piece from which the projection screen is fabricated being moved past the cutting stylus in a series of equally spaced parallel traverses, it is exceptionally difficult, due to minute variations in the velocity of the work piece, minute variations in the frequency of the signal used to modulate the cutting stylus, and the electro-mechanical transducer delays associated with the mounting structure of the cutting stylus, to maintain the ideal phase relationship from one groove to another. Commonly, the screen surface exhibits random streaks of light and dark areas running parallel to the grooves which are unpleasing to the eye. Also, the array of small, uniformly-sized microelements may give rise to diffraction fringes which, in turn, may cause a microelement to appear lighter or darker than it should, depending on the specific point in the audience space from which it is viewed, or even introduce color where there should be none.

To improve the aesthetic appearance of the screens, U.S. Pat. Nos. 3,754,811 and 3,788,171 disclose that the signal used to modulate the cutting position of the stylus should be intentionally randomized in frequency so as to produce optical microelements of random size but of similar image flux-distributing contour. While showing marked improvement in aesthetic appearance over similar screens comprised of substantially equally sized microelements, such screens still exhibit some diffraction effects when irradiated (e.g. color banding) which are somewhat unpleasant to the eye. These diffraction effects are noticeable to the viewer because the frequency of the randomized stylus control waveform is changed slowly in order to maintain substantial continuity of waveform slope and therefore light redistribution profile for adjacent microelements. Since the distance from a point on one microelement contributing to the appearance of a particular color to corresponding points on adjacent microelements is substantially equal, the color banding problem is not eliminated.

U.S. Pat. No. 3,809,457 discloses an improved screen in which the microelements are randomly sized, at least in one transverse direction, to the extent that the slope of a particular microelement's contour at any point along a row is not predictable from a knowledge of the slope of other microelement contours along the row. The distribution of such randomly sized microelements is predictable, however, to the extent that, on the average, all reasonably small areas on the screen (i.e., an area which is small compared to the entire area of the screen itself but nevertheless is large compared to the transverse structure defining each microelement) redirect normally incident light into solid audience angles of the same size and shape. Such a screen has improved aesthetic qualities because the random structure causes all small areas on the screen to appear uniformly bright to the viewer. U.S. Pat. No. 3,809,457 also discloses a method and apparatus for fabricating such a screen. Briefly, such a screen is fabricated by applying to the cutting stylus an electrical signal having a waveform which is random at least to the extent that the slope of such waveform is, at any point unpredictable (within a predefined range of slope values) from the knowledge of the slope at other points on the waveform, but is predictable to the extent that the slope probability density profile (i.e., its frequency distribution of slope values) over the irradiated screen area has substantially the same shape as the radiation-redistribution profile desired from that area.

While screens produced according to teachings of U.S. Pat. No. 3,809,457 exhibit an aesthetically pleasing surface when viewed from within the intended audience viewing angle, complex circuitry is needed to produce the required randomly varied cutting stylus signal. The reason why such circuitry is necessarily complex is briefly explained as follows. Random variation of the frequency of the cutting signal means that the signal generator must be frequency modulated by a noise signal. It is simple enough to build or buy a generator of an electrical noise signal and to feed it to any one of several commercial "function generators" whose frequency can be controlled by an externally supplied input voltage. However, if the frequency of the cutting signal is altered while its amplitude remains constant, the proportions of the microelements change and, therefore, so does the angle over which they spread light. To keep the larger and smaller microelements all with the same optical power, it is necessary to change the amplitude of the cutting signal in such a way that the amplitude is always proportional to the wavelength of the cut, which means inversely proportional to the cutting signal frequency. All this implies that the cutting signal amplitude must be under control of the same noise modulating signal that frequency modulates the generator.

SUMMARY OF THE INVENTION

It is, therefore, an object of the present invention to provide front and rear projection screen surfaces of improved aesthetic appearance, such improvement being accomplished by providing a screen surface having an identical phase relationship between adjacent rows of optical microelements.

Another object of the invention is to provide an apparatus for manufacturing projection screens of the type herein described.

These and other objects of the invention are accomplished by employing the cutting stylus of a sound recording head as a tool for cutting a plurality of rows of alternatively concave and convex optical microelements in the screen surface. A control signal which changes both in wavelength and amplitude at the end of each half cycle or full cycle but maintains the amplitude to wavelength ratio constant is recorded on a memory unit. The memory unit is stretched between two projections rigidly mounted on an X-Y milling table that supports the blank work piece in which the rows of microelements are cut. A pickup head mounted on the base of the sound recording head is brought into light contact with the memory element. As the milling table moves, a signal is generated in a pickup head which is coupled to a control circuit comprising an amplifying means and a band pass filter. From the control circuit the signal is applied to the cutting stylus to modulate the cutting depth thereof in such a manner as to produce image light redistribution microelements having a desired contour. Since the signal recorded on the memory element is used to control the cutting of each row, the microelements in each row maintain an identical phase relationship with the microelements in adjacent rows. Thus the present invention provides a simple and inexpensive means to produce projection screens exhibiting improved aesthetic appearance.

The invention, its objects and its various advantages will become more apparent to those skilled in the art from the ensuing detailed description of the preferred embodiment which follows, reference being made to the accompanying drawings wherein like numerals denote like parts.

DETAILED DESCRIPTION OF THE PREFERRED EMBODIMENT

Figure 1:
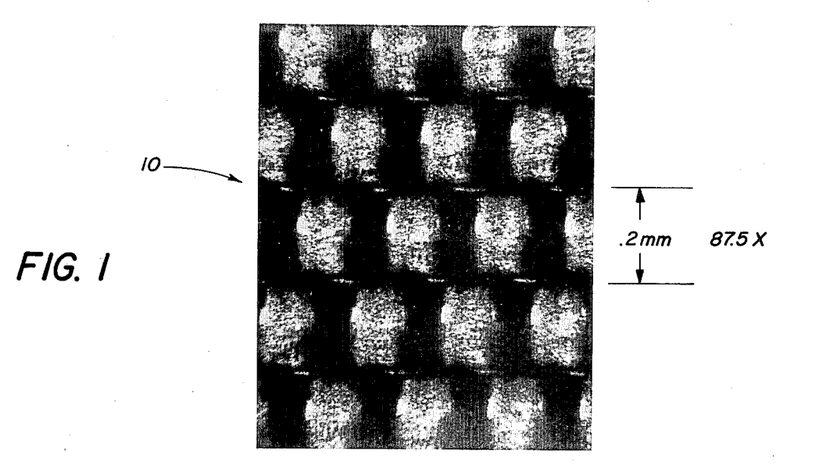
FIG. 1 is a photograph taken through a white light microscope showing a projection screen fabricated in accordance with the teachings of the prior art.

The photograph of FIG. 1 illustrates the positioning of the microelements of a projection screen surface 10 fabricated in accordance with the teachings of the prior art. Surface 10 defines a plurality of contiguous grooves of substantially uniform width which as viewed in FIG. 1 run in a horizontal direction. The depth of each groove undulates periodically according to a predefined waveform thereby defining a plurality of optical microelements that are slightly out of phase from row to row. When illuminated, surface 10 exhibits random streaks of light and dark areas and color bands running parallel to the grooves which detract from the aesthetic quality of the screen.

Figure 2:
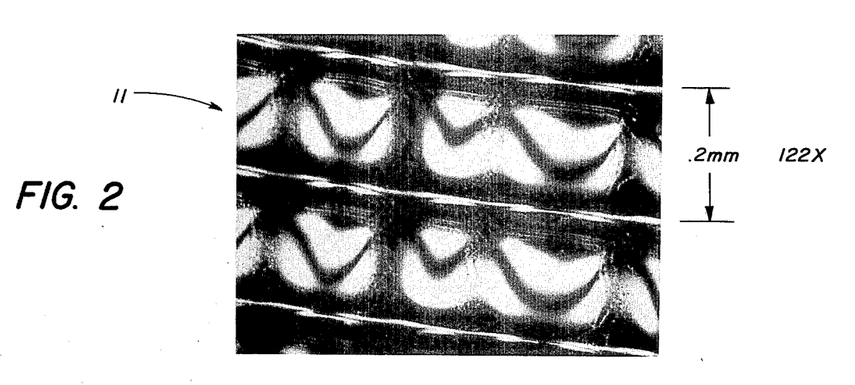
FIG. 2 is a photograph taken through an interference microscope of a projection screen fabricated in accordance with the teachings of the present invention.

The photograph of FIG. 2 illustrates the positioning of the microelements of a projection screen surface 11 fabricated in accordance with the teachings of the present invention. Again, the rows of microelements are horizontal but here the microelements randomly vary in scale (i.e., the length and amplitude of the microelements varies simultaneously so that their ratio, and therefore the light distributing properties of the microelements, remains the same) while maintaining an identical phase relationship with the microelements in adjacent rows. Projection screen surface 11, while having the light distributing qualities as surface 10, is much more pleasing aesthetically when viewed under normal lighting conditions having a surface which appears uniformly bright and substantially color free when viewed from within the intended audience viewing angle.

Figure 3:
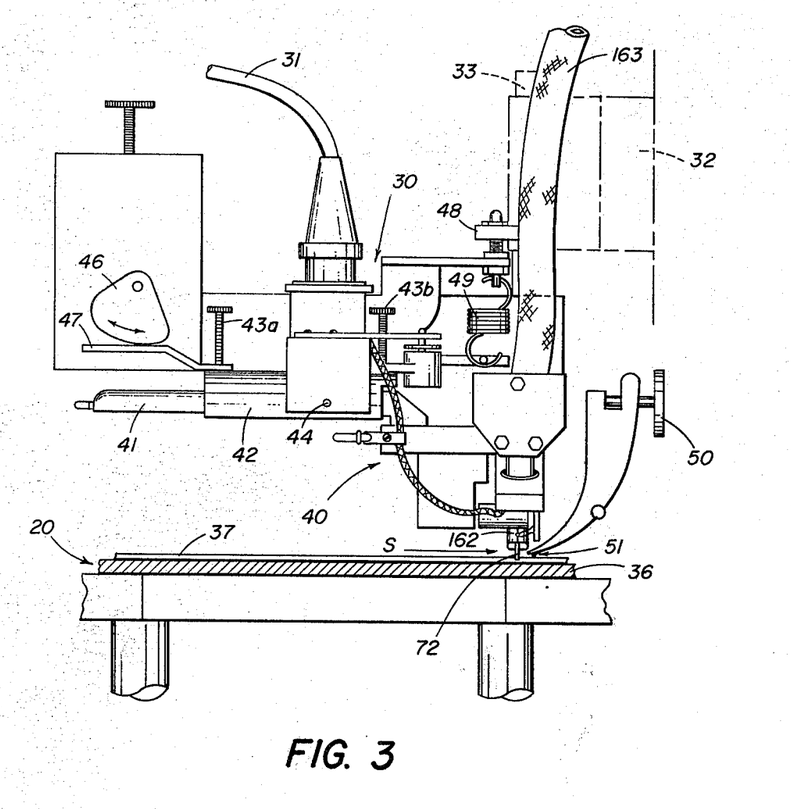
FIG. 3 is a side elevational view illustrating a portion of a stereo sound recording head used to fabricate screen masters in accordance with the teachings of the present invention.

In accordance with the present invention projection screens having a light-distributing surface similar in appearance to that illustrated by surface 11 are fabricated by a stereo sound recording head, equipment conventionally employed in the sound recording industry. In FIG. 3, a side elevation of the screen-cutting apparatus of the invention is shown in a cutting position relative to a blank master 20 wherein the screen microelements are to be formed. While the microelements can be cut directly in any readily workable material which itself can be used as the projection screen, the preferred method of manufacture comprises the fabrication of a screen master in some workable material, such as acetate or wax, from which a negative matrix or press tool of correct contour can be subsequently made. The negative matrix can then be used to produce a multitude of positive projection screens by well-known and economical duplicating processes, such as embossing, stamping or injection molding.

As shown in FIG. 3, the cutting apparatus comprises a conventional stereo sound recording head 30 which includes a cutting stylus S. While a monaural sound recording head could be used, a stereo head is preferred due to the high quality of auxiliary equipment available for conventional stereo heads. As in all sound recording heads, the cutting position of the stylus S is determined by the waveform of an electrical signal applied to the recording head, such as through input cables 31. The recording head is mounted on a milling machine tool holder 32 by a cylindrical fitting 33. Means are provided for controlling the vertical position of fitting 33 and the tool holder 32 so as to provide a coarse vertical adjustment of the recording head 30 above the surface of the blank master 20. The blank master may comprise, for instance, an aluminum plate 36 having a acetate coating 37, the thickness of which is sufficient to receive the contours of the projection screen surface. Recording head 30 includes a cutting assembly 40 having a horizontally extending support arm 41 which is slideably mounted on precision ways disposed in a saddle 42. By this arrangement, the horizontal position of the cutting assembly 40 can be varied. Set screws 43a and 43b serve to lock arm 41 in a desired horizontal position. Saddle 42 is pivotally mounted about a pin 44 disposed on recording head 30 so that the cutting stylus S, which forms a part of the cutting assembly 40, can be pivoted into engagement with the blank master 20. The rotational movement of a cam 46 serves to raise and lower the stylus S relative to the surface of the master 20 by contacting an arm 47 which is rigidly coupled with saddle 42. The downward cutting force applied to the stylus S is controlled by a screw 48 which serves to adjust the tension in spring 49. The precise depth of cut is controlled by adjustment screw 50 which varies the vertical distance of the stylus tip 72 from a small glass ball follower 51 which rides on the uncut surface of the master 20 a short, horizontal distance away from the stylus S.

Figure 4:
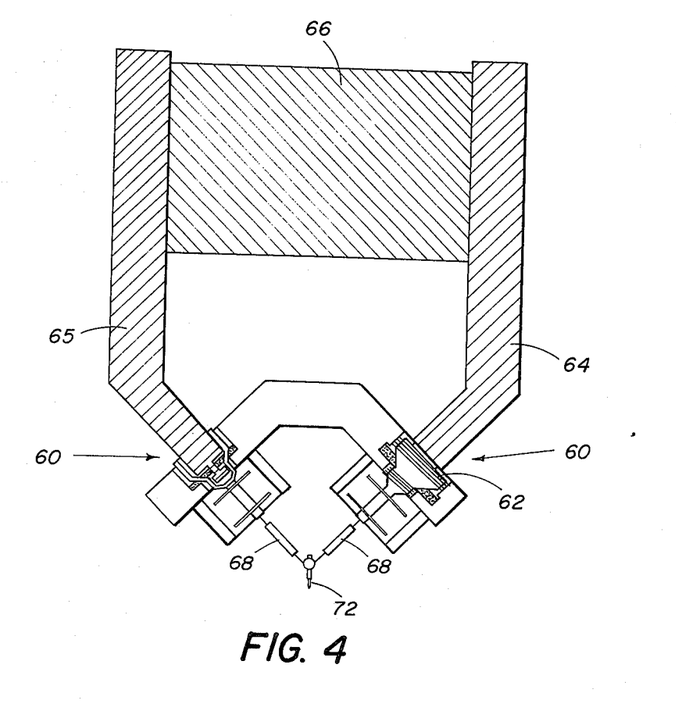
FIG. 4 is a constructional front elevation view of a portion of a stereo sound recording head of FIG. 3.

A sound recording head which has been found particularly well adapted for cutting projection screen masters is the Westrex Corporation, Model 3D Stereo Disc. As illustrated in FIG. 4, wherein a simplified constructional diagram of the mechanism which controls the stylus movement is shown, each recording channel of the stereo recording head contains a magnetic coil form assembly 60, each of which contains a driving coil 62 located in separate pole pieces 64 and 65 which are attached to a single magnet 66.

Figure 5:
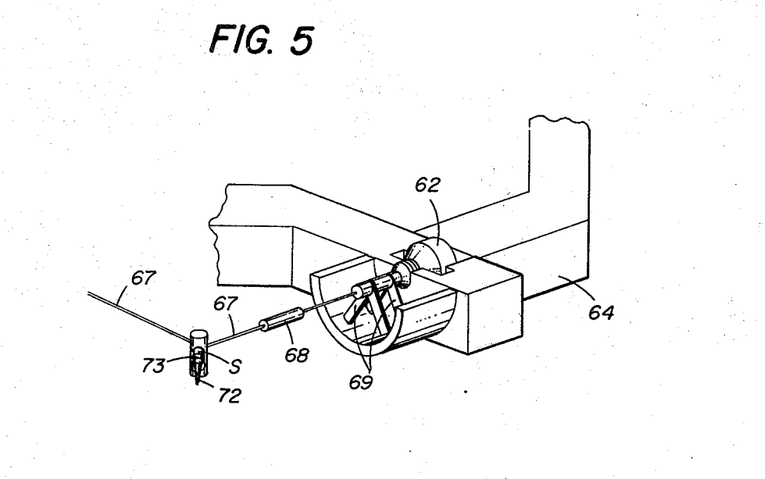
FIG. 5 is an enlarged, fragmentary perspective view of a portion of the apparatus shown in FIG. 4, illustrating the spring mounting arrangement of the cutting stylus.

As best shown in FIGS. 4 and 5, the coil assemblies 60 are attached to the stylus holder through links 67 which are stiff longitudinally, but flexible laterally. Braces 68 are provided in the center of the links 67 to prevent excessive lateral compliance. Springs 69 are provided at one end of each of the links 67 to prevent rotational movement of the cutting stylus S. The above-described structure results in a stiff, forward driving system with a high compliance in a lateral direction.

Figure 6:
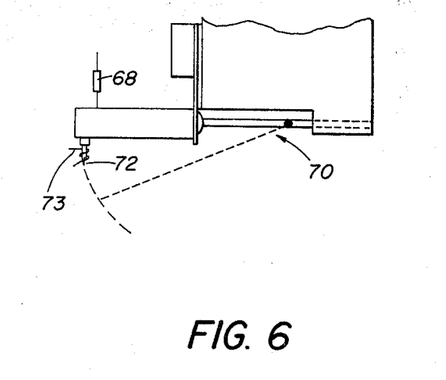
FIG. 6 is a side view of the cutting stylus of the recording head of FIG. 3 illustrating the stylus support.
Figure 7:
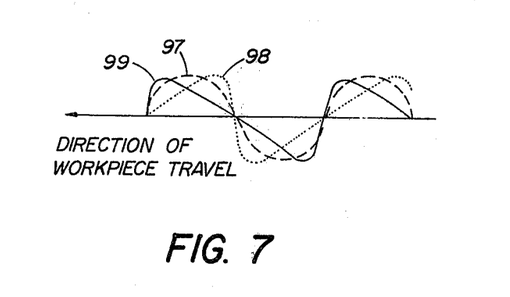
FIG. 7 illustrates the manner in which the waveform of the stylus driving signal differs from the stylus motion produced thereby.
Figure 12:
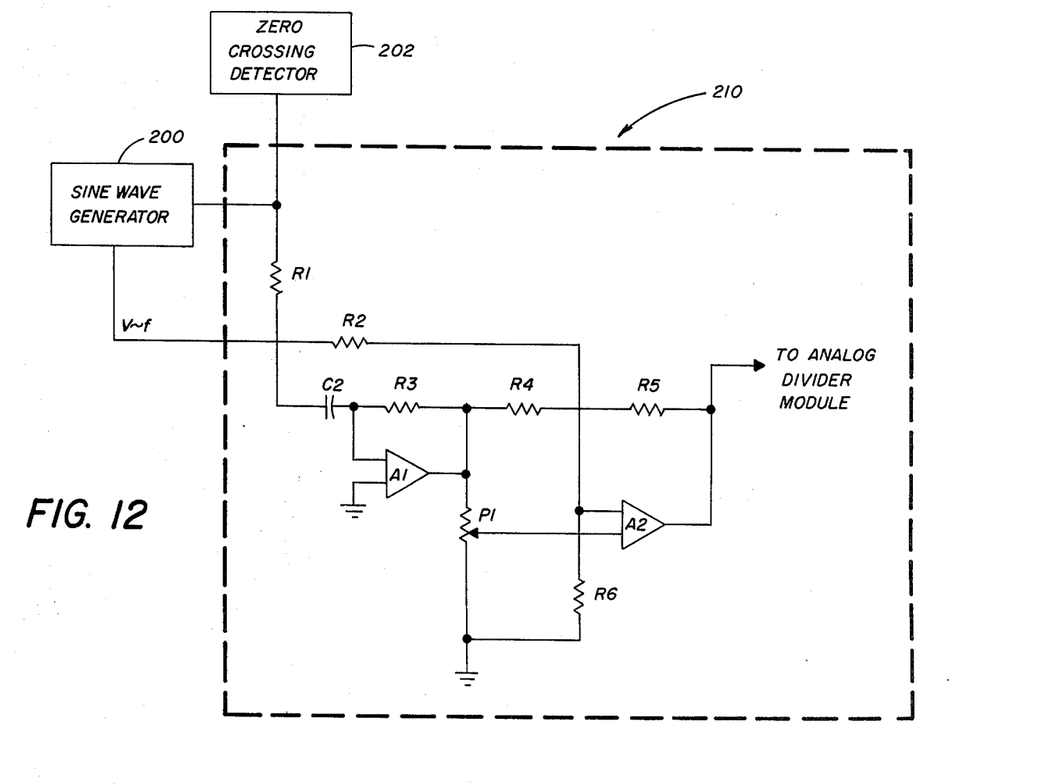
FIG. 12 is an electrical schematic of the counterbalancing asymmetrical circuit illustrated in FIG. 10.

As shown in FIG. 6, a cantilever spring 70 has an end connected to the stylus S and the opposite end connected to the pin 44. The use of a cantilever spring 70 in cooperation with the previously described stylus mounting structure permits the stylus to present a uniform impedance to complex motions in any direction in the vertical plane. The cutting tip 72 of stylus S has a profile which is designed to conform with the desired transverse cross-section of the screen microelements. However, since the stylus is not mounted for vertical movement but rather for pivotal movement on the cantilever spring 70, it will traverse an arcuate path, as shown in phantom lines in FIG. 6. It is necessary, therefore, to drive the stylus S with a somewhat different waveform than that which corresponds to the desired microelement contour. Referring to FIG. 7, if a waveform 97 having the desired profile is applied to the cutting stylus S, the resulting groove will have a depth profile as shown in the asymmetrical waveform 98. To compensate for the asymmetry, it is necessary to drive the cutting stylus S with a counterbalancing asymmetrical waveform 99 which the arcuate stylus movement converts to the depth profile desired (i.e., waveform 97). Circuitry to provide the desired counterbalancing asymmetrical waveform is shown in FIG. 12.

Figure 8:
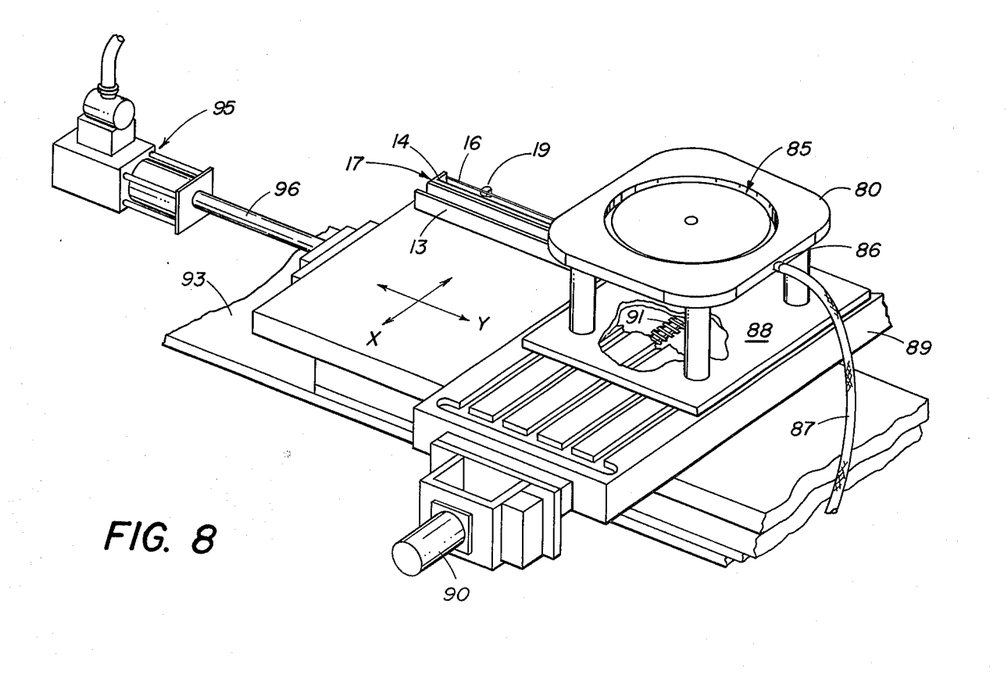
FIG. 8 is a perspective view of apparatus adapted to translate a blank projection screen master relative to the screen cutting apparatus depicted in FIG. 3.

In fabricating projection screen masters by use of the apparatus described above, the work piece is moved relative to the heated cutting stylus S in a series of equally spaced, parallel traverses. At the same time, the cutting position of the stylus S is electronically varied relative to the surface of the blank master 20 to produce the desired longitudinal cross section or depth profile. Apparatus for moving the master relative to the stylus S is depicted in FIG. 8. During the cutting operation, the master 20 is supported by a table 80 which rides atop a cross travel carriage 88 and an X-Y milling table 89. Table 80 is preferably fabricated from a nonmagnetic metal such as aluminum so as not to interfere with the magnetic cutting assembly 40. In the upper surface of table 80, a circular groove 85 is provided. At the base of the groove 85 is an opening (not shown) which communicates with a nozzle 86 located on the edge of the table. Attached to nozzle 86 by a hose 87 is a vacuum source (not shown). By this arrangement, the master 20 is securely fastened to the surface of table 80 by a vacuum coupling. Carriage 88 is movable in the X direction and its position is controlled with precision by a conventional stepping motor 90 which acts through lead screw 91. Carriage 88 itself rides atop the longitudinal travel carriage 93 of the X-Y milling table 89. Carriage 93 is movable in the Y direction by a hydraulic pneumatic motor 95 which precisely controls the rate at which the carriage 93 moves via piston rod 96.

Rigidly attached to the carriage 93 is a rigid member 13. Two projections 14 made of a magnetic material such as steel are mounted on the member 13. A magnetic sound recording tape 16 on which the desired stylus control waveform is recorded is stretched between the projections 14. The tape is held firmly onto the projections 14 with permanent magnets 17. A sound pickup head 19 mounted onto the base of the cutting apparatus and therefore fixed in space relative to the table 80 is pushed lightly against the tape 16. The signal generated on the pickup head 19 is processed by control circuitry shown in FIG. 9 and described in detail below and then applied to the cutting stylus S.

Figure 10:
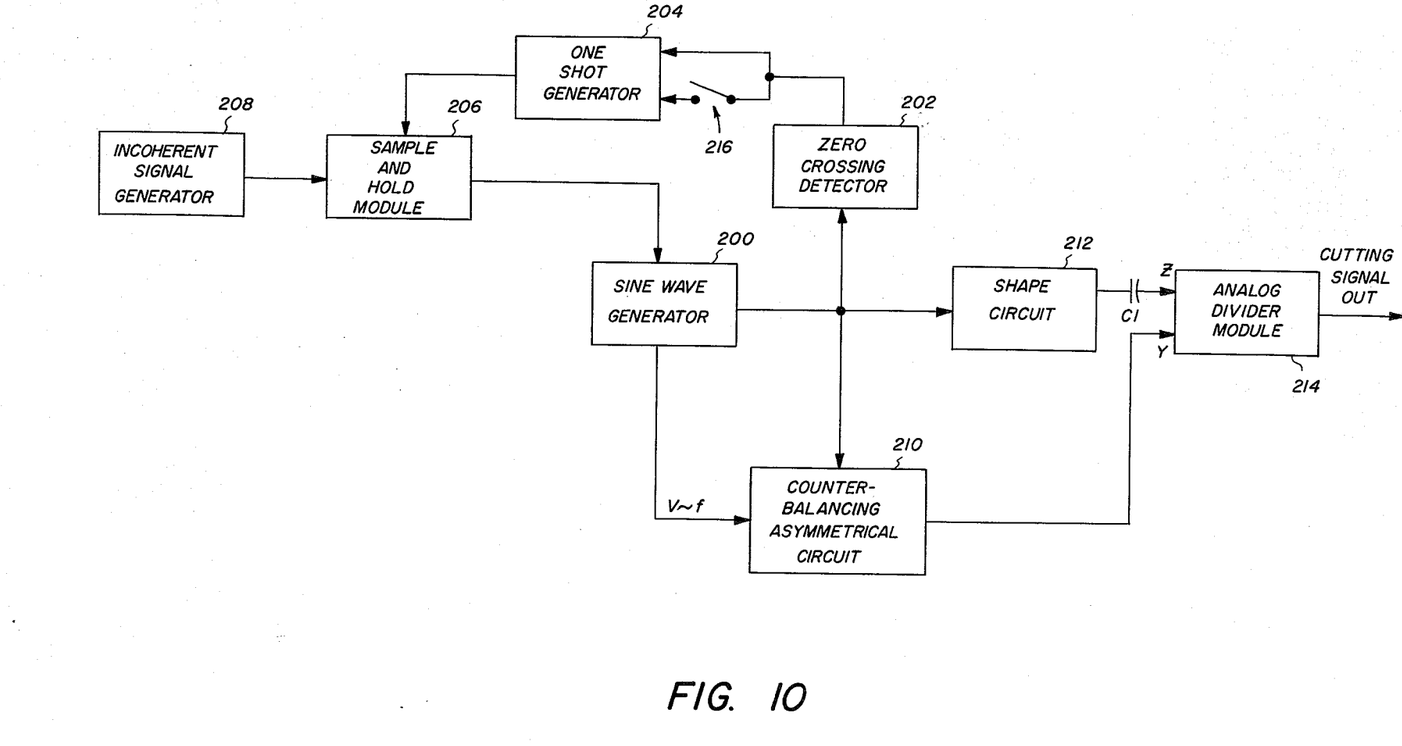
FIG. 10 is a block diagram of the preferred circuitry for generating the desired randomized waveform which is recorded on the memory element.

The preferred circuitry for producing the waveform recorded on the magnetic tape 16, and generated on the pickup head 19 is shown in FIG. 10. The circuit includes a frequency modulatable sine wave generator 200, a zero-crossing detector 202 that provides an output signal each time the sine wave passes through zero, a one-shot generator 204 that produces one narrow width pulse in response to each zero-crossing signal, a sample and hold module 206 that acquires a voltage from a signal source 208 during the width of the output pulse produced by the one-shot generator 204 and then stores this voltage essentially unchanged until the next sample command pulse arrives from this generator, a circuit 210 which generates an asymmetrical waveform to counterbalance the asymmetry produced by the arcuate travel path of the cutting stylus S, a shape circuit 212 which converts the frequency modulated sine wave output of the generator 200 into a waveform having the desired microelement contour and an analog divider module 214 wherein the shaped waveform is divided by a voltage proportional to its frequency so that the "optical power" of the microelements remains constant. "Optical power" as used herein refers to the ability of a microelement to redistribute image flux throughout a predefined solid audience angle.

The basic sinusoidal waveform from which the stylus cutting signal is ultimately derived is produced by the sine wave generator 200. In order to randomly vary the size of adjacent microelements, the zero-crossing detector 202 provides an output signal each time the sine wave produced by the generator 200 passes through zero. Each output signal of the detector 202 activates a one-shot generator 204 to produce a pulse whose width is an insignificant fraction of the period of the sine wave, for example less than one percent. Upon receipt of the pulse from the one-shot generator 204, sample and hold module 206 acquires a modulating voltage provided by the signal generator 208 that is completely incoherent relative to the sine wave produced by the generator 200. As a result of this relative incoherency, the values assumed by the modulating voltage in successive sampling periods is strictly a matter of statistics, related only to the waveform produced by the source 208. For example, if the voltage is of triangular waveform and of much higher frequency than any frequency of the sine wave produced by the generator 200, the probability distribution of the successive values of the modulating voltage is flat between two sharp limits. The modulating voltage acquired by the module 206 from the source 208 during the period of the pulse from the one-shot generator 204 is applied to the generator 200 as a frequency modulator until the waveform passes through zero, at which time pulses from the detector 202 and generator 204 command the module 206 to again sample the amplitude of the voltage from the source 208 and apply this voltage to the generator 200 as a frequency modulator. It can be seen therefore that the frequency of the waveform changes abruptly each time a command signal is received by the sample and hold module 206.

Figure 11:
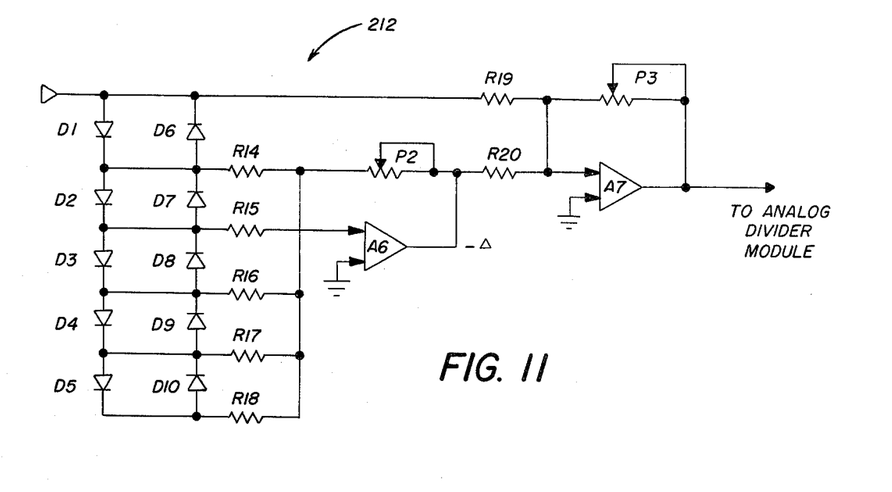
FIG. 11 is an electrical schematic of the shape circuit illustrated in FIG. 10.

To cut microelements having a cross-section which is contoured to redistribute normally incident radiation in such a manner as to produce a uniform radiance throughout a solid angle, a waveform must be generated that differs from a true sine wave in that the peaks are flattened relative to the lower amplitude portions of the wave. The determination of the equations defining such a waveform form no part of the present invention. These equations are disclosed in the above referenced, commonly assigned U.S. Pat. No. 3,754,813 issued Aug. 28, 1973, to DePalma et al., incorporated herein by reference, and referral thereto should be made if specific information is desired. To produce the desired waveform from the frequency modulated sine wave output of the generator 200, such output is fed to the shape circuit 210. As shown in FIG. 11, this signal is segmented by reason of having to overcome successively the forward voltage drops across diodes D1–D10. Diodes D1–D5 and D6–D10 serve to segment the positive and negative going portions of the input signal, respectively. Operational amplifier A6 serves to sum the contributions of the various signals to produce a difference signal $\Delta x$ having a waveform representing the difference by which the desired waveform differs from the frequency modulated sine wave. The contributions of the individual segments to the output of the amplifier A6 are adjusted by varying the values of resistors R14–R18. The output of the amplifier A6 is adjustable in amplitude by potentiometer P2. By simply adding the difference signal $\Delta x$ which is of a polarity opposite that of the unshaped signal due to the polarity reversing effect of amplifier A6, the desired waveform is produced. Such addition is performed by the amplifier A7. Resistors R19 and R20 and potentiometer P3 serve to control the gain provided by the summing amplifier A7. The output of the amplifier A7 is then fed to the Z input of the analog divider module 214 through a capacitor C1 which eliminates any drift or offset in the amplifier A7.

As indicated above, in order to drive the cutting stylus S in such a manner as to cut symmetrical microelements along the groove length, it is necessary to apply an asymmetrically distorted waveform to the drive coils of the stylus which, due to the arcuate movement of the stylus, is converted into the desired groove-cutting stylus movement. It has been determined that the required asymmetry can be achieved if the frequency modulated output of the sine wave generator 200 is divided by a term that includes the cosine of the same frequency. Thus:

$$Y' = \frac{Y}{A(1 \pm K \cos wt)} \qquad 1.$$

where
 $Y$ is the sine wave output of the generator 200
 $Y'$ is the desired asymmetrically distorted waveform
 $A$ is an arbitrary scale constant
 $k$ is an adjustable distortion parameter
 $w$ is radians per second, and
 $t$ is time As shown in FIG. 12, the portion of the circuit 210 comprising resistors R1 and R3, capacitor C2 and operational amplifier A1 determines the differential of the sine wave output of the generator 200 according to the equation:

$$d/dT\ (a\ \sin\ wt) = aw\ \cos\ wt \qquad 2.$$

where
 $a$ is the amplitude of the waveform, and
 $w$ is radians per second (i.e. $2\pi \times$ the frequency of the waveform)

The equation shows that the differential of the sine wave output is the cosine wave with an amplitude that is proportional to frequency. Since the divisor needed to adjust the amplitude so as to keep the waveforms similar is also a constant (over one full cycle at least)

that is proportional to frequency, the differential voltage is added directly to a voltage proportional to frequency ($V \sim f$) available from an auxiliary output of the generator 200. The potentiometer P1, resistor R5 and amplifier A2 provide adjustable gain control and thus determine the value of the parameter k which is arbitrary and independent of frequency. Resistors R2, R4 and R6 provide proper impedance matching for the various circuit components. The output of circuit 210 which is the divisor shown in equation (1) above, is fed to the Y input terminal of analog divider module 214. The analog divider module 214 divides the instantaneous amplitudes of the input signals Y and Z so as to provide an output, the amplitude of which is inversely proportional to frequency. Since the frequency applied to terminal Z increases as the amplitude of the signal applied to terminal Y increases, the amplitude to frequency ratio remains constant. As a result there is no discontinuity in slope for adjacent microelements, only an abrupt change in scale.

A switch 216 (see FIG. 10) coupled between the zero-crossing detector 202 and the one-shot generator 204 allows the scale change to be made after one complete cycle of the waveform or alternatively, after every half cycle of the waveform. If the switch 216 is open so that the zero crossing detector 202 is connected to only the one input of the one-shot generator 204 the size of the cut microelement remains constant for one full cycle as shown in FIG. 2. If the switch 216 is closed so that the detector 202 is connected to both the direct and inverted inputs of the one-shot generator 204, the size of the cut microelement changes every half cycle.

Figure 9:
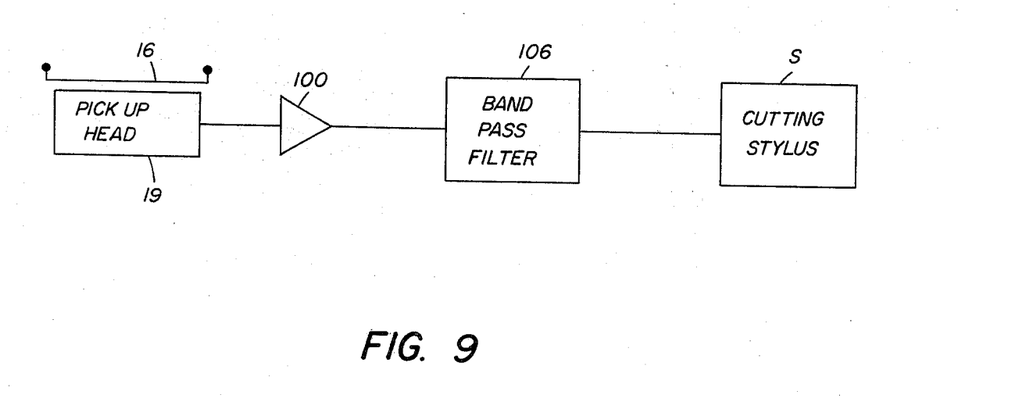
FIG. 9 is a block diagram of the preferred circuitry for driving the cutting stylus of the sound recording head.

In FIG. 9, the preferred control circuitry for driving the cutting stylus S in such a manner as to produce microelements which distribute image throughout a common solid audience angle is illustrated in block form. The waveform of the electrical signal applied to the drive coil 62, of course, determines the depth profile of each of the rows of microelements. As shown, the signal recorded on the tape 16 and detected in the pickup head 19 is passed through an amplifier 100 and a band pass filter 106 which is designed to pass only the fundamental waveform recorded on the magnetic tape 16. The output of the band pass filter 106, which is essentially noise free, is then applied to the drive coils 62 of the cutting assembly 40 to produce the desired profile in coating 37.

To initiate the cutting operation, a start button is pressed which pivots the cutting assembly 40 about pin 44 into a cutting position, causes the hydraulic-pneumatic motor 95 to move the milling machine carriage 93 in the Y direction and causes the above-described electronic circuitry to drive the cutting stylus S according to the waveform of the electric signal applied thereto.

To assist in cutting the work piece with the requisite accuracy and smoothness of finish, the stylus S is heated by heating coil 73 to a temperature sufficient to soften adequately the acetate coating of the work piece. As the heated stylus S cuts a groove in the screen blank, a continuous sliver or chip is extricated from the screen blank surface. To continuously draw this sliver away from the screen blank, a vacuum nozzle 162 (shown in FIG. 3) connected to a vacuum source through a hose 163 is positioned adjacent stylus S during the cutting operation.

After cutting a groove of predetermined length, a microswitch (not shown) is actuated by the table 80 which serves to stop pneumatic motor 95, activate a solenoid which moves cam 46 of the recording head clockwise into a position to pivot the cutting assembly into an inoperative position and actuate stepping motor 90 so as to move the carriage 88 and screen blank 20 a predetermined distance in the X direction. The microswitch also returns the milling machine carriage 93 to a starting position on the Y axis which, in turn, actuates a second microswitch. When actuated, the second microswitch rotates the cam 46 counterclockwise to permit the recording head to pivot into an operable cutting position. The cutting process is then cyclically repeated without interruption until the entire screen master has been cut. Since the magnetic tape 16 tracks with the carriage 93, the stationary pickup head 19 applies the same portion of the waveform recorded thereon to the drive coils 62 during the cutting of each row. As a result, the microelements in each row maintain an identical phase relationship with the microelements in adjacent rows.

After making the projection screen master in accordance with the afore-described apparatus, projection screens can be produced therefrom by making a negative matrix or master from the original, and casting positive screens in a resinous material from the negative matrix. Preferably, the negative matrix is made from General Electric RTV-60 silicone rubber which is prepared by adding three grams of dibutyl tin dilaurate RTV curing catalyst to two pounds of the RTV-60 rubber, agitating the mixture with an electric stirrer for five minutes and placing it in a bell jar which is then evacuated to a pressure of 150 microns of mercury for about 20 minutes. Upon fixing sidewalls to the edge of the original master, the RTV rubber mixture is poured into this mold so that no air is entrapped. After curing, the negative master is then used to cast positive projection screens.

The invention has been described in detail with reference to a preferred embodiment thereof, but it will be understood that modifications can be effected within the spirit and scope of the invention. For example, other magnetic, electrical, optical or mechanical memory elements can be substituted for the magnetic tape 16 provided, of course, that an appropriate pickup head is also selected to transform the recorded waveform into a series of electrical pulses.

We claim:

1. In a projection screen of the type having a plurality of rows of alternately concave and convex optical microelements which are contoured to redistribute incident radiation uniformly throughout a predefined solid audience angle, the improvement wherein both the length and amplitude of abutting microelements in each row changes while the amplitude to length ratio remains constant.

2. A projection screen according to claim 1 wherein the microelements in each row have an identical phase relationship with the microelements in adjacent rows.

3. In a projection screen of the type prepared by an audio recording technique and adapted to present an image projected thereon to a predefined audience space, the screen comprising means defining a plurality of contiguous, rectilinear grooves, each of the grooves having a depth which undulates along the groove length to define a row of alternately concave and convex microelements which are contoured to redistribute incident radiation with substantially uniform radiance throughout a predefined solid audience angle, the improvement wherein the microelements in each groove have an identical phase relationship with the microelements in adjacent grooves.

4. A projection screen according to claim 3 wherein both the length and amplitude of abutting microelements in each groove changes while the amplitude to length ratio remains constant.

5. Apparatus for use in fabricating a radiation-redistributive device, said apparatus comprising:
  a. a cutting stylus;
  b. a support member having means to securely fasten the surface in which said radiation-redistributive device is to be formed;
  c. means for providing relative movement between said stylus and said support member to cut in said surface a plurality of rows of alternately concave and convex optical microelements of substantially uniform optical power;
  d. control means operatively coupled to said stylus, said control means including a memory element having a waveform recorded thereon defining a desired contour for said microelements, said memory element being mounted on one of said stylus and said support member, a detecting means positioned to sense said waveform on said memory element as each row is cut and to provide first electrical signals representative thereof and a circuit means responsive to said first electrical signals for generating second electrical signals, which, during the relative movement between the support member and the stylus causes the position of the stylus to vary in such a manner as to cut the microelements in each row with the desired contour, the microelements having an identical phase relationship to the microelements in adjacent rows.

6. The apparatus according to claim 5 wherein both the amplitude and frequency of the waveform recorded on said memory element changes at the points corresponding to the end of each microelement while the ratio of amplitude to wavelength remains constant.

7. The apparatus according to claim 5 wherein said memory element comprises a magnetic tape capable of storing said waveform in the form of magnetized marks and said detecting means comprises a magnetic reading head operable to sense said marks and to produce said first electrical signals therefrom.

8. Apparatus for use in fabricating a radiation-redistributive device having an image flux redistributing surface comprising means defining a plurality of rectilinear grooves, each groove varying in depth along the groove length to define a row of alternately concave and convex optical microelements, said apparatus comprising:
  a. a sound recording head including a movably mounted cutting stylus having a cutting profile which conforms to the desired transverse cross section of the microelements;
  b. a movable support member having means to securely fasten the surface in which the grooves are to be formed;
  c. means for moving said stylus and said support member relative to each other in a series of parallel traverses to cut the grooves; and
  d. control means operatively coupled to said stylus, said control means including a memory element mounted on said support member and having a predetermined undulating waveform recorded thereon, said waveform periodically changing in both amplitude and frequency while maintaining the ratio of amplitude to wavelength constant, a detecting means mounted in fixed position relative to said memory element, and adapted to sense said waveform as each groove is cut and to provide first electrical signals representative thereof, and a circuit means responsive to said first electrical signals for generating second electrical signals, which, during the relative movement between said support member and said stylus causes the position of said stylus to vary in such a manner as to cut microelements in each groove of varying scale but with substantially uniform optical power and with an identical phase relationship to the microelements in adjacent grooves.

9. The apparatus according to claim 8 wherein the frequency and amplitude of said waveform changes every cycle.

10. The apparatus according to claim 9 wherein the frequency and amplitude of said waveform changes every half cycle.

11. In a projection screen of the type having a surface defining a plurality of contiguous grooves, each of said grooves having a depth which undulates along the groove length in accordance with a periodic waveform and thereby defines a row of alternately concave and convex optical microelements which are contoured to redistribute incident radiation uniformly throughout a predefined solid audience angle, the improvement wherein both the length and amplitude of the microelements in each row changes at the points corresponding approximately to the completion of each cycle of said waveform and the amplitude to length ratio of the microelements remains constant, said length and amplitude changes providing periodic, abrupt changes in the scale of said microelements which vary by a random amount while maintaining substantially identical the absolute value of the slopes of corresponding points on the contours of the microelements.

* * * * *